Aug. 24, 1937.                P. G. DARLING                2,091,028
                              INDICATOR DEVICE
                        Filed Dec. 2, 1936          2 Sheets-Sheet 1
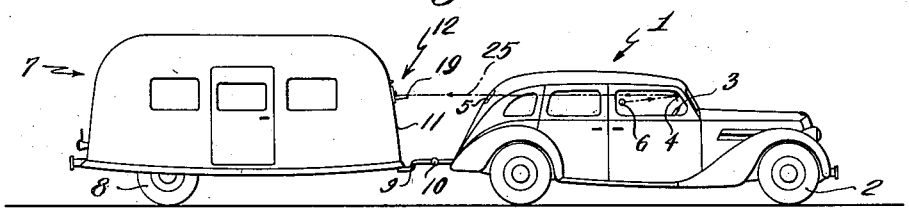
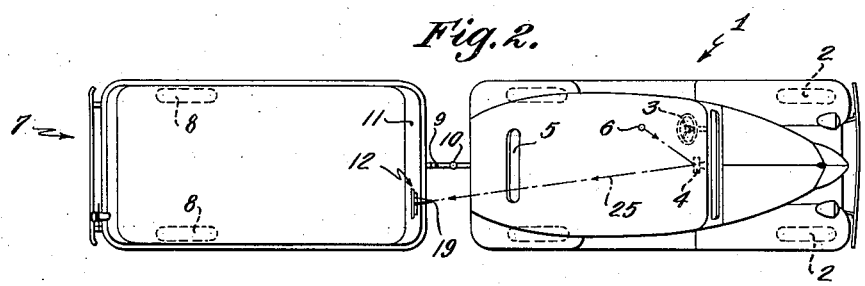
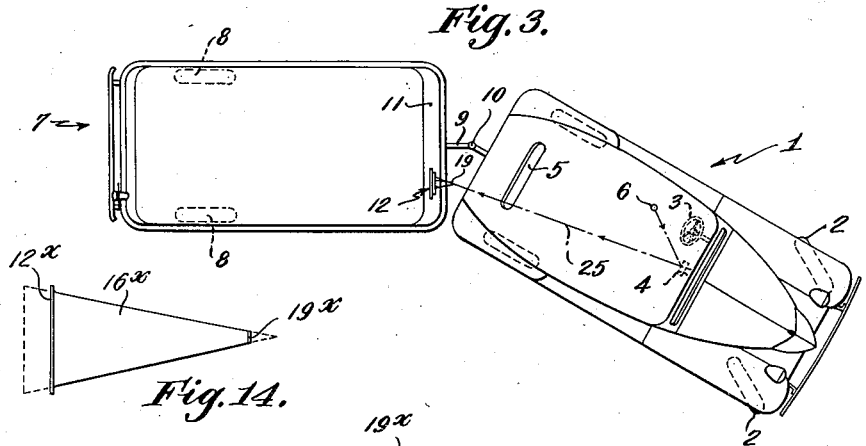
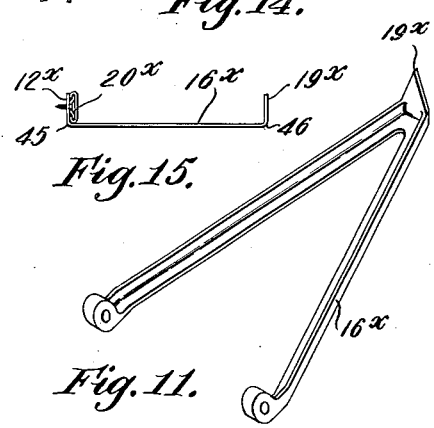
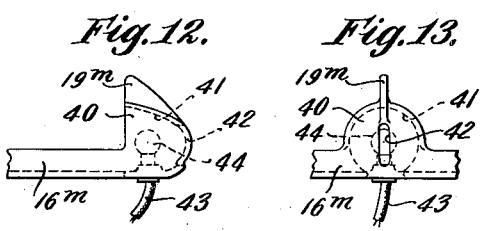
Inventor,
Philip G. Darling,
by Roberts, Cushman & Woodbury
Attys.

Aug. 24, 1937.  P. G. DARLING  2,091,028
INDICATOR DEVICE
Filed Dec. 2, 1936   2 Sheets-Sheet 2
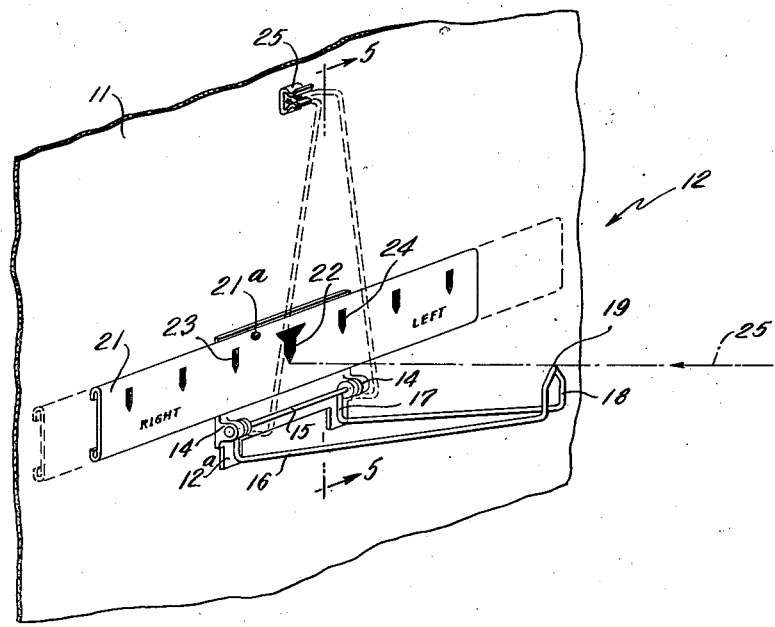
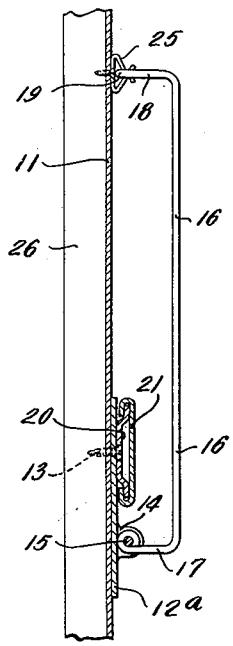
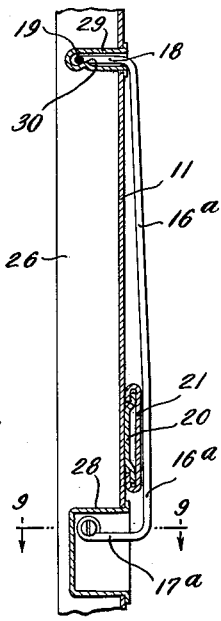
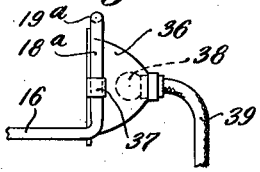
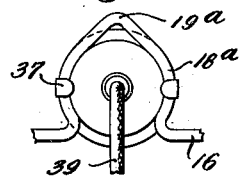
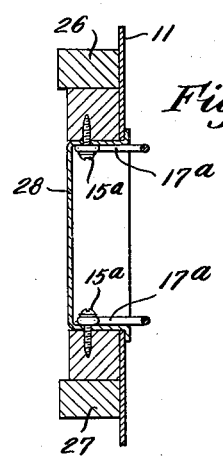
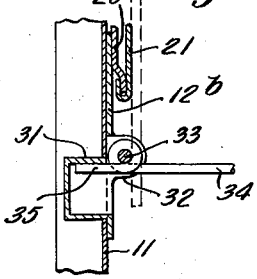
Inventor,
Philip G. Darling,
by Roberts, Cushman & Woodberry
Att'ys.

Patented Aug. 24, 1937

2,091,028

UNITED STATES PATENT OFFICE 2,091,028

INDICATOR DEVICE

Philip G. Darling, Stratford, Conn.

Application December 2, 1936, Serial No. 113,808

9 Claims. (Cl. 33—46)

This invention pertains to indicators and relates more particularly to an indicating device designed to assist the driver of a motor vehicle having an attached trailer when attempting to back the vehicle. While the drivers of commercial trucks, by much experience, ofter acquire great skill in backing attached trailer trucks, even in such confined spaces as city alleys, the average driver of a pleasure car usually finds it extremely difficult to back his car when a trailer is attached thereto with any certainty as to the direction the trailer will take.

The rapidly growing use of camping or house trailers such as are so commonly employed for vacation purposes and the crowded condition of the highways and of many motor vehicle camping grounds make it highly desirable that the ordinary driver be possessed of means whereby he may manipulate his car and its attached trailer with greater assurance and with less danger of damage either to his own property or that of others.

When it is attempted to back a car with an attached trailer, the driver of the car has little to guide him as to the initial direction the trailer takes when the backing force is applied, since he usually sees only the front surface of the trailer, and in the initiation of the backing movement the deviation of this front surface from its normal driving position is too small to be observed. Even if, by the use of a laterally disposed rear view mirror, the operator is enabled to see the side of the trailer, it is still difficult to determine at the outset of the backing operation whether the trailer is starting to turn toward the right or toward the left.

A further difficulty which the inexperienced driver encounters arises from the fact that to back a trailer in a given direction, he must turn the steering wheel in the opposite direction, which is just the reverse of the movement used in backing the car itself, so that the habit which he has acquired in manipulating his automobile must be consciously overcome each time he tries to back a trailer. Moreover, a given movement of the steering wheel produces a much greater turning of the trailer than of the car itself so that buckling of the trailer relative to the car often takes place so quickly that the driver is taken unaware.

It has heretofore been proposed to provide mechanical means in the nature of an instrument having a dial and pointer located in the field of vision of the driver and within the car and actuated by mechanical connections from the trailer to assist the driver in backing, but such instruments as are known to me are costly, they must be carefully installed by skilled persons, they must be disconnected each time the trailer is unhooked, and they require space upon the already crowded instrument board of the car.

The principal object of the present invention is to provide an indicator which will accurately and clearly show the driver the direction in which the trailer is turning even from the inception of the turning movement.

A further object is to provide an indicator of simple and inexpensive character which employs optical rather than mechanically acting parts for indicating the direction of turning, to provide an indicator whose physical elements are all permanently mounted on the trailer and need not be uncoupled or otherwise manipulated when the trailer is unhooked, to provide an instrument capable of accurate and easy adjustment at the time of its installation so as to fit the particular situation and the needs of the user, and to provide an indicator which may easily be manufactured, which is durable, light in weight, visible by day or night and which may readily be installed even by those relatively unskilled in the use of tools.

Other and further objects of the invention will be made manifest in the following more detailed description and by reference to the accompanying drawings in which Fig. 1 is a diagrammatic side elevation of an automobile having a trailer attached thereto and showing the indicator device of the present invention secured to the front end of the trailer;

Fig. 2 is a plan view of the automobile and trailer of Fig. 1, showing them in the normal position for driving in a substantially straight line with the longitudinal axes of the automobile and trailer substantially coinciding with each other;

Fig. 3 is a plan view similar to Fig. 2, but showing the relative positions of the automobile and trailer while backing them at an angle to the straight back direction;

Fig. 4 is a fragmentary perspective view showing a portion of the front wall of the trailer, to larger scale, with the improved indicator device mounted thereon;

Fig. 5 is a fragmentary vertical section substantially on the line 5—5 of Fig. 4;

Fig. 6 is a fragmentary side elevation illustrating a modified form of indicator device having means for illuminating its parts;

Fig. 7 is a fragmentary front elevation of the parts shown in Fig. 6;

Fig. 8 is a view similar to Fig. 5 but illustrating a modified indicator device;

Fig. 9 is a fragmentary horizontal section substantially on the line 9—9 of Fig. 8;

Fig. 10 is a fragmentary section on the same plane as Fig. 5, but showing a further modification;

Fig. 11 is a perspective view illustrating a modified form of bracket constituting a part of the indicator device;

Fig. 12 is a fragmentary side elevation illustrating the forward end of a bracket of further modified form provided with illuminating means;

Fig. 13 is a front elevation of the parts shown in Fig. 12;

Fig. 14 is a plan view of a further modified form of indicator; and

Fig. 15 is a side elevation of the device of Fig. 14.

Referring to the drawings, the numeral 1 designates a motor vehicle, here illustrated as a pleasure car, having the forward wheels 2, the steering wheel 3, the rear view mirror 4, and the usual rear window 5. The numeral 6 indicates substantially the position of the eye of the driver. As shown in Figs. 1, 2, and 3, a trailer 7 is attached to the automobile 1, the trailer having the wheels 8 and a draw-bar 9 which is secured by any usual form of coupling 10 to the rear end of the automobile. The trailer 7 has the forward end wall 11, and to this forward end wall of the trailer the improved indicator device of the present invention is secured, the indicator device being designated generally by the numeral 12.

Referring to Figs. 4 and 5, the indicator device of the present invention preferably comprises a support, for example, a plate 12$^a$ which is fixedly secured to the forward wall 11 of the trailer, for example, by means of screws 13 (Fig. 5). This support or plate 12$^a$ is furnished with a pair of forwardly projecting ears 14 supporting a pivot shaft 15 upon which is mounted a bracket 16. As illustrated in Figs. 4 and 5, this bracket consists of a length of wire suitably bent to provide a pair of short legs 17 having eyes at their ends for the reception of the pivot rod 15, these short legs 17 normally abutting the forward face of the support 12$^a$ when the bracket is in its normal position, that is to say, a substantially horizontal position as illustrated in Fig. 4. The forward end of the bracket has an upstanding portion 18 provided at its upper end with a sighting or index element 19, preferably in the form of a sharp point.

The indicator device also preferably comprises a fixed member 20 which may be secured to the support 12$^a$ in any desired manner, for example, by the same screws 13 which connect the support to the end wall 11 of the trailer body. The member 20 constitutes a holder or retainer for a horizontally slidable scale member 21. This scale member preferably is provided adjacent to its center with an index element or target 22 (Fig. 4) for cooperation with the sighting member 19, as hereinafter described. The scale is also preferably furnished with indications or graduations 23 and 24 at the right and left-hand sides of the central target 22. The scale 21 is normally fixed relative to the trailer body but in mounting the indicator upon the trailer body and after the support 12$^a$ has been fixed to the trailer body, this scale 21 may be shifted to the right or left until the target 22 bears the proper relation to the sighted device 19, and thereupon the scale may be fixed in its adjusted position in any desired manner as, for example, by forming a prick punch indentation 21$^a$ in the material of the scale, such indentation so deforming the material of the scale that it can no longer slide along the member 20. Any other suitable means of fixing the scale in position may be employed and, in fact, with the arrangement illustrated in Figs. 4 and 5, the friction between the parts 20 and 21 may be found sufficient to retain the scale in adjusted position without any more positive retaining means.

In the preferred form of the device, as illustrated in Figs. 4 and 5, the bracket 16 with its sighting element 19, may when not in use, be swung upwardly about the axis of its pivot shaft 15 until it lies substantially parallel to the front wall 11 of the trailer. If desired, a retaining clip 25 may be secured to the front wall 11, such clip engaging the member 18 of the bracket and thus holding the latter securely in its inoperative position, thus substantially preventing accidental injury to the indicator device when the trailer is not attached to the automobile.

In a modified construction illustrated in Figs. 8 and 9, and which permits the bracket to be folded up even more closely against the trailer body, the front wall 11 of the trailer body, which is usually furnished with uprights 26 and 27, for example, at its inner side, is provided with an opening for the reception of a box member 28 which is sunk into the forward wall of the trailer body and which is provided with pivot means, such as the screws 15$^a$, furnishing the pivotal axis for the bracket 16$^a$, the latter having the short legs 17$^a$ formed with eyes at their ends which engage the pivot screws 15$^a$, the legs 17$^a$, when the bracket is in horizontal or operative position, bearing against the rear or inner surface of the cup member 28. Retaining means such as a socket member 29 is also seated in an opening in the wall 11, such socket having a projection 30 over which the sighted member 19 of the bracket springs when the bracket is in the inoperative position, thus preventing it from dropping accidentally to the horizontal position when not in use. With this arrangement the bracket is disposed so close to the forward face of the wall 11 when not in use that accidental injury is made quite improbable.

In a further modification, illustrated in Fig. 10, the front wall 11 is also provided with an opening for the reception of a cup member 31 which may form a part of a support 12$^b$, similar to the support 12$^a$ above referred to, such support having ears 32 for a pivot pin 33 upon which the bracket 34 is mounted. In this instance the bracket has rearwardly extending lugs 35 which, in the normal or operative position of the bracket, engage the underside of the top wall of the cup 31.

The indicator device, as illustrated in Figs. 4 and 5, for example, is useful so long as it is light enough for the driver of the automobile to see the parts 19 and 22, but at night these parts would not ordinarily be visible and thus would not assist the driver in the backing operation. In order that the device may be useful at night as well as by day, it is proposed to provide the forward end of the bracket 16 with means whereby the target 22 may be illuminated. For this purpose, as shown in Figs. 6 and 7, the upstanding portion 18$^a$ of the bracket may be so shaped as to form a support for a lamp housing and a reflector 36, the latter having clips 37 by means of which it is attached to the part 18$^a$. Within this reflector housing may be mounted the lamp 38, receiving current through a cable 39 from a battery carried by the trailer, or from any other suitable source. The light from the lamp will be thrown rearwardly against the scale 21, illuminating the target 22, and against this illuminated background the operator may readily discern the upwardly directed sighting element 19a.

As a further modification of the bracket, it is contemplated that, as illustrated in Fig. 11, the bracket may be made either as a casting or as a drop forging or the like, comprising a single unitary piece of metal 16× quite rigid in its construction and having an integral upstanding and upwardly tapering portion 19× constituting the sighting element. This bracket may be mounted in the same way as the bracket 16 above referred to and is designed to function in the same way as the bracket 16.

In Figs. 12 and 13 a modified arrangement for illuminating the parts is shown wherein the bracket 16m, which may be of cast material, is furnished with an integral housing 40 at its forward end, such housing having an inner reflecting surface 41 designed to direct light rearwardly toward the scale 21 of the indicator device. This housing is provided with a socket for a lamp 44 which receives current through a flexible conductor 43 from any suitable source. The upper part of the housing 40 is furnished with an upstanding fin 19m which constitutes the sighting element, and preferably the housing is furnished with a narrow vertical slot 42 (Fig. 13) at its forward end, said slot being aligned vertically with the fin 19m and permitting a narrow beam of light to emerge forwardly, thus to assist the driver in locating the sighting fin 19m.

The scale 21 above referred to may be graduated at opposite sides of the target 22 in equal divisions if desired, or such divisions as indicated by the graduations 23, 24, etc. may be spaced with special reference to the lengths of the automobile and the trailer so as to show turning diameters in feet or other appropriate unit of measurement for the combination of the particular car and trailer. For example, with the average car and trailer lengths, an angle of 30° between the car and trailer axes will give a turning diameter of forty feet, which would correspond to a scale mark three and a quarter inches from the center line of the target 22 if the front pointer or sighting element 19 is spaced at a distance of six inches in front of the scale 21.

In mounting the improved indicator device upon the trailer, the support 12a is first attached to the front wall 11 of the trailer at such a point that it will be visible to the driver of the automobile, for example, by reflection through the rear view mirror. Preferably it is located on the right-hand side of the trailer so that the driver's head will not block the line of sight 25 from the mirror over the sighting element 19 to the scale 21.

After the support 12a has been secured to the front wall 11 of the trailer body in the chosen position, the automobile and trailer are coupled together and the automobile is driven forwardly in a straight line until the front-to-rear axes of the automobile and trailer are substantially coincident. Thereupon the scale 21 is moved transversely along the member 20 until the sighting device 19 exactly aligns with the point of the target 22, as viewed by the driver in the seat of the automobile, such line of sight as has been suggested being obtained by reflection through the rear view mirror 4 or, alternatively, by direct vision as by the driver's turning and looking rearwardly directly at the indicator. If the sighting or indexing element 19 is not at the proper horizontal level to obtain this desired line of sight, the bracket 16 may be bent either up or down until, when in its normal position, the line of sight 25 passes across the extreme top of the member 19 on its way to the lower end of the target 22. After the scale has thus been adjusted, it may be fixed in position as above described.

In use, if it be desired to back the trailer in a straight line, the operator, watching the sighted device 19 through the rear view mirrow, will manipulate the steering wheel of the automobile so as to keep the sighting device 19 always in line with the target 22. If the trailer begins to turn either to the right or left, the sighted device 19 will appear to move either to one side or the other of the target 22, and to correct the movement of the trailer, it is merely necessary for the driver of the automobile to turn his steering wheel in the direction which the sighted device 19 should apparently move to bring it back into coincidence with the target 22.

On the other hand, if it be desired to back the trailer and automobile either to right or left of a straight line, the driver will turn the steering wheel of the automobile as he begins to back it so that the sighting device 19 will appear to coincide with one of the index graduations 23 or 24 at one or the other side of the target 22 and will then keep the steering wheel in such position that the image of the device 19 remains in substantial coincidence with the selected scale of graduation throughout the completion of the turning movement.

It will thus be evident that the backing of the trailer may be accomplished with the greatest ease and accuracy merely by the use of the optical indicator here provided, and this without the necessity of employing any unusual mechanical parts between the automobile and trailer. This optical method of determining the movement of the trailer to one side or the other operates upon somewhat the same principle as the mirror galvanometer in that it uses a long light ray instead of mechanical parts, with the advantage of the great accuracy permitted by the optical pointer that is employed.

In the simpler construction illustrated in Figs. 14 and 15, the indicator comprises a triangular piece 16× of metal, for instance sheet brass or aluminum, bent transversely at 45 and 46, respectively, to provide an integral attaching portion 12× and an integral upright pointed index portion 19×. The part 12× is designed to be secured to the trailer body by screws 13 or the like, which also secure in place the member 20× upon which is mounted the scale member 21× marked like and corresponding to the scale member 21 above described. This indicator is attached, adjusted, and used in the same way as that above described, but is somewhat simpler and cheaper.

It is further to be noted that the device is far superior to those in which mechanical connections are necessary between the automobile and the trailer, since, with the present arrangement, the coupling and uncoupling of the trailer and car is in no way complicated and no connections are left loose so as to drag behind the automobile when the trailer is uncoupled or otherwise to cause trouble and annoyance to the user. Furthermore, with the present arrangement where the entire indicator, so far as its mechanical features are concerned, is permanently secured to the trailer, no errors due to lost motion between the automobile and the trailer are liable to occur, and thus a greater accuracy of operation may be expected than when mechanical connections are necessary.

While certain desirable embodiments of the invention have been illustrated and described by way of example, it is to be understood that the invention is not necessarily to be limited to these precise arrangements but that any other suitable devices of equivalent character and functioning in the same general manner are to be regarded as within the scope of the invention as defined in the appended claims.

I claim:

1. An indicator device for attachment to an auto-trailer, said indicator device comprising a target and a sighting element spaced forwardly from the target, the target being movable transversely of the trailer so that it may be adjusted to be in alignment with the sighting device, as viewed by the automobile driver, when the trailer and automobile are in normal relative position for travel in a substantially straight line.

2. An indicator device for attachment to an auto-trailer, said indicator device comprising a scale member normally fixed to but adjustable transversely of the trailer, said scale having a target element adjacent to its center, and a sighting device normally fixed relatively to the scale but spaced forwardly therefrom, said scale member being so initially adjusted that when the automobile and trailer are in normal position for travel in a substantially straight line the sighting element and the target element will be in alignment as viewed by the automobile driver in the usual rear view mirror.

3. An indicator device for use in backing a motor vehicle with an attached trailer, said indicator comprising a pair of relatively fixed index elements mounted upon the trailer in position to be viewed by the driver of the motor vehicle, said index elements being spaced apart a substantial distance in a front-to-rear direction and so disposed relatively to the driver's line of vision that when the front-to-rear axes of the motor vehicle and trailer substantially coincide, said index elements are aligned as viewed by the driver.

4. Indicator means for use with a motor vehicle having a rear view mirror and a trailer attached to the motor vehicle, said indicator means being carried by the trailer and comprising parts which are spaced in a front-to-rear direction but which are normally aligned as viewed in the rear view mirror by the driver, said parts being so constructed and arranged as apparently to shift laterally with respect to each other as viewed in the mirror when the trailer and motor vehicle are out of normal driving alignment.

5. Indicator means for use with a motor vehicle having a rear view mirror and a trailer attached to the motor vehicle, said indicator means being carried by the trailer and comprising a graduated scale fixed to the trailer, and a sighting element carried by the trailer and spaced forwardly of the scale, said sighting element being aligned with a predetermined graduation of the scale as viewed by the driver of the motor vehicle in the mirror when the longitudinal axes of the motor vehicle and trailer substantially coincide, said sighting element and scale being so constructed and arranged that the sighting element appears to shift laterally of the scale as viewed in the mirror when the trailer is swung relatively to the vehicle.

6. An indicator device of the class described comprising a support and means for fixing it to the forward end of an auto-trailer, a bracket hinged to the support and normally extending forwardly and substantially horizontally, said bracket having a sighting element at its forward end, and a scale secured to the support, said scale having graduations thereon.

7. An indicator device of the class described comprising a support and means for fixing it to the forward end of an auto-trailer, a bracket projecting forwardly from the support, the bracket having a sighting element adjacent to its forward end, means on the support constituting a target optically cooperable with the sighting element, and means for illuminating the target.

8. An indicator device of the class described comprising a support and means for fixing it to the forward end of an auto-trailer, a bracket projecting from the support, the bracket having a sighting element adjacent to its forward end, a target disposed rearwardly of the sighting element and normally fixed relatively to the latter, a lamp housing adjacent to the sighting element, said housing comprising a reflector for directing light rearwardly toward the target, the light housing having a slot vertically aligned with the index element to show the position of the latter, and means for supplying current to an electric lamp within the housing.

9. An indicator device of the class described comprising a support and means for fixing it to the forward end of an auto-trailer, a bracket hinged to the support and normally disposed in a substantially horizontal position, the bracket having a sighting element adjacent to its forward end, a target rearwardly of the sighting element and normally fixed relatively thereto, the target being movable when not in use to a substantially vertical position closely adjacent to the forward surface of the trailer body, and means for retaining the bracket in such vertical position.

PHILIP G. DARLING.